(12) United States Patent
Seel et al.

(10) Patent No.: US 8,087,484 B2
(45) Date of Patent: Jan. 3, 2012

(54) METHOD FOR LIMITING SETPOINT TORQUES DURING ENGINE CONTROL

(75) Inventors: Andreas Seel, Hemmingen (DE); Holger Niemann, Shanghai (CN); Oliver Kaefer, Murr (DE); Per Hagman, Alingsas (SE)

(73) Assignee: Robert Bosch GmbH, Stuttgart (DE)

( * ) Notice: Subject to any disclaimer, the term of this patent is extended or adjusted under 35 U.S.C. 154(b) by 793 days.

(21) Appl. No.: 12/064,983

(22) PCT Filed: Aug. 4, 2006

(86) PCT No.: PCT/EP2006/065086
§ 371 (c)(1),
(2), (4) Date: Aug. 4, 2008

(87) PCT Pub. No.: WO2007/025843
PCT Pub. Date: Mar. 8, 2007

(65) Prior Publication Data
US 2009/0132108 A1    May 21, 2009

(30) Foreign Application Priority Data
Aug. 29, 2005 (DE) .......................... 10 2005 040 778

(51) Int. Cl.
*B60W 10/08* (2006.01)
(52) U.S. Cl. ..................... 180/65.265; 903/906; 701/22; 60/706
(58) Field of Classification Search ............... 180/65.21, 180/65.26, 65.265, 65.28, 65.285; 903/905, 903/906; 701/22, 51, 54, 58; 60/706, 716, 60/719
See application file for complete search history.

(56) References Cited

U.S. PATENT DOCUMENTS

| 6,076,500 | A | 6/2000 | Clement et al. |
| 6,285,946 | B1 | 9/2001 | Steinmann |
| 6,490,511 | B1 | 12/2002 | Raftari et al. |
| 6,588,256 | B2 * | 7/2003 | Gassner et al. ............ 73/114.15 |
| 6,862,511 | B1 * | 3/2005 | Phillips et al. .................. 701/54 |
| 6,964,192 | B2 | 11/2005 | Bauer et al. |

(Continued)

FOREIGN PATENT DOCUMENTS

DE    19739565    3/1999

(Continued)

OTHER PUBLICATIONS

International Search Report, PCT International Patent Application No. PCT/EP2006/065086, dated Dec. 15, 2006.

*Primary Examiner* — John Walters
(74) *Attorney, Agent, or Firm* — Kenyon & Kenyon LLP

(57) ABSTRACT

A method for controlling a motor vehicle drive, in particular a hybrid drive, is provided, the motor vehicle drive having at least two individual motors. In a first method step, at least one total setpoint torque is calculated. In a second step, the at least one total setpoint torque is split into at least two individual setpoint torques of the at least two individual motors. Subsequently, in a first individual torque comparison step, the sum of the at least two individual setpoint torques is compared with the total setpoint torque. In the event of a difference by more than a predefined tolerance value, a limitation step is initiated. In this limitation step, the at least two individual setpoint torques are each multiplied by a limiting factor to generate at least two limited individual setpoint torques.

11 Claims, 3 Drawing Sheets

U.S. PATENT DOCUMENTS

| | | | |
|---|---|---|---|
| 7,017,348 B2 * | 3/2006 | Tajima et al. | 60/706 |
| 7,445,066 B2 * | 11/2008 | Hommi et al. | 180/65.26 |
| 2005/0060079 A1 | 3/2005 | Phillips et al. | |

FOREIGN PATENT DOCUMENTS

| | | |
|---|---|---|
| DE | 19748345 | 5/1999 |
| DE | 19748355 | 5/1999 |
| DE | 10038181 | 3/2002 |
| DE | 10155128 | 6/2002 |
| DE | 10210684 | 10/2003 |
| DE | 102004013581 | 11/2004 |
| DE | 10320017 | 12/2004 |
| EP | 1548253 | 6/2005 |

* cited by examiner and ROM check, program sequence check, instruction test).
METHOD FOR LIMITING SETPOINT TORQUES DURING ENGINE CONTROL

FIELD OF THE INVENTION

The present invention relates to a method for controlling a motor vehicle drive which is suitable in particular for limiting setpoint torques in the event of an erroneous implementation of a torque request. Such methods are used, in particular, for controlling motor vehicle drives in hybrid vehicles. The present invention furthermore relates to an engine control unit having an arrangement for carrying out the method according to the present invention.

BACKGROUND INFORMATION

Control devices for a drive unit which control or regulate the drive unit in particular regarding a drive torque output are described in, for example, German Patent Application No. DE 103 20 017 A1, the drive unit being an internal combustion engine of a motor vehicle. In this case the motor vehicle normally includes a driver input sensing device operatable by the driver of the motor vehicle, in particular a foot-operatable accelerator pedal which is provided for outputting an output signal representing the instantaneous operating state of driver input sensing device. A control unit receives the output signal of the driver input sensing device and assigns at least one setpoint output quantity, in particular a setpoint drive torque of the drive unit, to the received output signal. The drive unit is controlled by the control unit in such a way that an actual output quantity which is output by the drive unit approaches the setpoint output quantity. Such control devices are available in different designs for regular motor vehicle engines, in particular gasoline and diesel engines, for example, the Bosch engine control system having an electronic gas pedal (EGAS).

Furthermore, performing continuous engine monitoring for detecting malfunctions in the control unit is conventional. This is used, in particular, for protecting the vehicle occupants in the motor vehicle and external traffic participants. Unintended acceleration of the vehicle is to be prevented. The core of continuous torque monitoring is the comparison of an actual torque provided by the engine with an allowable torque. In the normal case, the actual torque is less than the allowable torque. If the actual torque exceeds the allowable torque, there is a malfunction in the engine control unit and an error response leading to a safe vehicle state is initiated. The engine control units are normally monitored according to a three-level monitoring concept. The engine is actually controlled, in particular the setpoint torque is defined, on the first level known as the function level. The second level (monitoring level) is designed as continuous torque monitoring. On this level, an allowable torque is ascertained as a function of vehicle and engine functions, among other things, and compared with an actual engine torque. Level 2 is secured in a complex manner (double storage of all variables, cyclic RAM
Level 3 is used for securing the computer.

German Patent Application No. DE 102 10 684 A1 describes a method for monitoring a torque of a drive unit of a vehicle. The torque to be monitored is compared to an allowable torque; the allowable torque is adjusted to the torque to be monitored and a malfunction is detected if the torque to be monitored differs from the allowable torque by more than a first predefined value, the malfunction being detected only in the case where a position of an operating control element, in particular an accelerator pedal position, has been within a first predefined tolerance range at least since a first predefined point in time.

German Patent Application No. DE 197 39 565 A1 describes a method for controlling the torque of a drive unit of a motor vehicle in which the torque of the drive unit is set at least according to the driver's input, the actual torque of the drive unit being determined and a maximum allowable torque being ascertained at least on the basis of the driver's input. The torque is reduced and/or limited when the actual torque exceeds the maximum allowable torque. At least one operating state is established in which the torque of the drive unit is increased due to additional load. The maximum allowable torque is increased during this at least one operating state. In particular, the allowable torque is increased during operation with a cold drive unit and/or when operating high-load consumers.

German Patent Application No. DE 197 48 345 A1 describes a method for controlling the drive unit of a vehicle, the torque of the drive unit being predefined as a function of a driver's intended torque derived from the position of an operating control element operatable by the driver and as a function of a setpoint torque which is predefined from at least one external function which influences the torque instead of or in addition to the driver's input. A maximum allowable torque is predefined and, when this maximum allowable value is exceeded, the torque is reduced via the corresponding actual value. The maximum allowable torque is formed at least as a function of the position of the operating control element, and the maximum allowable torque is formed as a function of the setpoint torque of the at least one external function if this setpoint torque is greater than the allowable torque which is a function of the position of the operating control element. The external function may increase the torque, for example, with respect to the driver's input as an engine-drag-torque control or cruise control.

The above-described conventional torque monitoring methods are not applicable to hybrid vehicles in a straightforward manner. In hybrid vehicles, at least one additional torque source (motor) is used in addition to the internal combustion engine. In most cases this is an electric motor.

Conventionally, there is only one motor in the vehicle, which contains an engine control unit, which receives diverse torque request information from the outside (for example, via a brake control unit or an adaptive cruise control (ACC)) via a signal bus. The engine control unit checks the integrity of the received external torque request signals and checks the torque request information for plausibility with the aid of the vehicle status signals available to it. The engine control unit then determines, on the basis of the external information and other signals (such as the driver's input, which is set via the accelerator pedal, for example), the torque requested from the engine (setpoint torque) and controls the motor accordingly without communicating with another control unit.

In the event of multiple motors being present, the input torque requested by the driver, which is set, for example, by operating an accelerator pedal, must now be split in the engine control unit among the torque sources present (at least two motors). This is performed as a function of a number of environmental variables, for example, with the purpose of setting the operating point which is the most favorable from the consumption point of view for all torque sources. Such a method is described in German Patent Application No. DE 102 02 531 A1, for example. The split torques must then be transmitted from the engine control unit to other control units associated with the individual motors if necessary.

SUMMARY

Therefore, an example method for operating a motor vehicle drive is proposed which avoids the disadvantages of the conventional methods. In particular the example method according to the present invention makes it possible to detect errors in the torque splitter of hybrid vehicles and thus to enhance the availability of the overall system.

In accordance with the present invention, the setpoint torques of the individual torque sources are limited as a function of a torque comparison of setpoint and summed torques. This limitation takes place on level 1, so that premature shutoff of individual torque sources is prevented. Instead of full shutoff of a motor, a percentage limitation of the setpoint torque may be carried out.

In the example method according to the present invention, the motor vehicle drive has at least two individual motors, i.e., torque sources. For example, these may be, as described above, one internal combustion engine and one electric motor. At least one total setpoint torque is calculated in a first step of the method. This total setpoint torque is then split, in a second step, into at least two individual setpoint torques corresponding to the number of individual motors, i.e., torque sources. Similarly to the above-described conventional method, the sum of the at least two individual setpoint torques is then compared to the total setpoint torque in a first individual torque comparison step. When a difference is established between the sum of the at least two individual setpoint torques and the total setpoint torque which is greater than a predefined tolerance value, a limitation step is then initiated. In this limitation step, the at least two individual setpoint torques are each multiplied by a limiting factor, preferably a limiting factor that is less than one. At least two limited individual setpoint torques are thus generated.

The predefined tolerance value may be, for example, a predefined tolerance threshold which is set, for example, in a vehicle control unit. The tolerance value may, however, also be set to zero, so that the limitation step is carried out in the event of any difference between the sum of the at least two individual torques and the total setpoint torque. As an alternative, this limitation step may be carried out only when the sum of the at least two individual setpoint torques exceeds the total setpoint torque. Thus, different tolerance values may be predefined for excessively high or excessively low total torques.

Contrary to the conventional method, no automatic switchover to EMB operation takes place as soon as a difference and thus an error is detected. Rather, the limitation step makes a stepwise or adjusted response to differences possible, so that, for example, an error correction may be attempted using small limiting factors. The driver of the motor vehicle usually does not feel this limitation process, so that the limitation is not associated with any discomfort for the driver, at least initially. Alternatively or additionally, the driver may also be informed about the performance of a limitation step via a display, for example, when the required limiting factors drop below certain predefined values. The driver of the motor vehicle may then be prompted, for example, to take the motor vehicle to a repair shop.

The example method according to the present invention may be advantageously refined in different ways. One refinement may be, for example, that the example method according to the present invention is combined with the above-described conventional torque request method for generating the total setpoint torque. For this purpose, the total setpoint torque is generated in a torque request step in which initially a setpoint torque is calculated and is subsequently compared with an allowable torque. The smaller of these two torques (calculated setpoint torque and allowable torque) is then used as the total setpoint torque in the torque request.

Alternatively or additionally, additional correction steps or monitoring steps may also be performed. The above-described example method may be refined, for example, by comparing the at least two limited individual setpoint torques with the at least two individual setpoint torques in at least one second individual setpoint torque comparison step. This comparison is used for detecting errors in the limitation step. If a difference is established between the individual setpoint torques and the respective limited individual setpoint torques, for example, again by more than a predefined tolerance value (which again may be equal to 0 or may have different tolerance values), an error is detected. Corrected individual setpoint torques are then generated. For example, these corrected individual setpoint torques may be the smaller of the two individual setpoint torques, namely the individual setpoint torque and the corresponding limited individual setpoint torque.

As described above, the limitation steps make an appropriate response to differences that appear and thus to errors in the torque splitter possible. To ensure that even in the event of such a limitation the sum of the individual setpoint torques corresponds to the desired setpoint torque, it is advantageous to select the limiting factors in the limitation step to be the same for all individual setpoint torques. In particular, the limiting factor may correspond to the ratio between the total setpoint torque and the sum of the at least two individual setpoint torques. In this way errors that appear may be corrected, at least in theory, in an optimum way.

Furthermore, even subsequent errors may be detected and corrected via a comparison between the individual setpoint torques or limited individual setpoint torques and the corresponding actual torques. For this purpose, the method according to the present invention may be refined in such a way that, subsequently, i.e., after generating the individual setpoint torques, or (in the case of an error) the limited or corrected individual setpoint torques (referred to hereafter as individual setpoint torques), these at least two individual setpoint torques are converted in a conversion step into at least two control quantities for controlling the at least two motors or torque sources. These control quantities are relayed to the corresponding torque actuators of the drives via suitable electronics. To monitor this conversion, at least two actual torques, which represent the torques actually set in the motors, may in turn be fed back from the at least two motors and used for monitoring. For example, these actual torques may be ascertained by measuring an internal cylinder pressure, for example, an internal cylinder pressure in the combustion chamber of a diesel engine. Alternatively or additionally, oscillations of a rotational speed signal of a crankshaft may also be utilized. Furthermore, the control quantities themselves may also be back-calculated into corresponding actual torques. In the case of electric motors, a conversion of current, voltage, and rotational speed of the electric motor may be used for monitoring. Furthermore, feedback via a bus system may follow and/or monitoring via at least one torque sensor on a crankshaft or a transmission input stage may also be used for generating an actual torque.

A comparison between the at least two actual torques and the at least two individual setpoint torques may then be performed. If the actual torques and the corresponding individual setpoint torques differ by more than a predefined threshold, the corresponding control quantities or all control quantities may be influenced. The corresponding control quantities or all control quantities are then replaced by at least one replacement control quantity.

The comparison between the actual torques and the individual setpoint torques is often made difficult in that the conversion from individual setpoint torque into corresponding control quantities and then into the corresponding torques in the motor is associated with a time delay. Accordingly, it may be advisable to filter the at least two actual torques and/or the at least two individual setpoint torques before performing the comparison and/or to delay them using a time-delay element.

BRIEF DESCRIPTION OF THE DRAWINGS

The present invention is explained in greater detail with reference to the figures.

DETAILED DESCRIPTION OF EXAMPLE EMBODIMENTS

Figure 1:
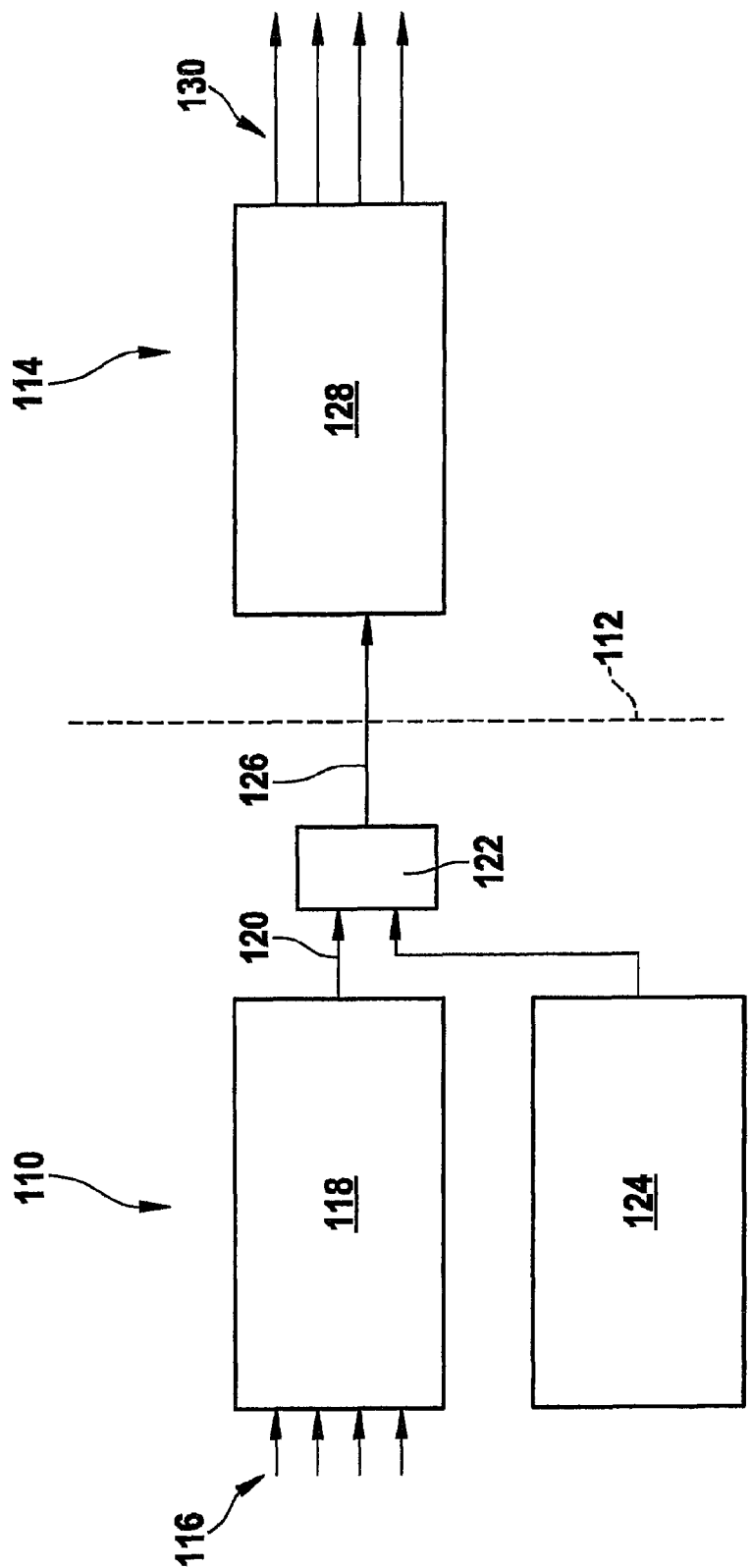
FIG. 1 shows a conventional method for monitoring a torque request.

FIG. 1 shows a conventional method in which erroneously excessive torques are recognized with the aid of a so-called torque limitation on the calculation level (level 1, reference numeral 110 in FIG. 1).

The method is divided into two consecutive method steps which are symbolically separated here by separating line 112. Separating line 112 separates level 1 (calculation level, reference numeral 110) from level 2 (conversion level, reference numeral 114). On calculation level 110, setpoint torques 120 are initially calculated from different input quantities 116 in a calculation step 118. For example, input quantities 116 may contain electronic information of an accelerator pedal, via which the input of a driver regarding a certain torque is transmitted to an engine control unit. In calculation step 118, these input quantities 116 are converted into corresponding setpoint torques 120. This conversion may take place in step 118, for example, continuously or in predefined time intervals. The conversion in step 118 may take place, for example, with the aid of characteristics fields, functions, or electronic tables.

Setpoint torques 120 generated in this way in step 118 are compared with allowable torques 124 in a first comparison step 122. If it is established that calculated setpoint torques 120 exceed these allowable torques 124, setpoint torques 120 are replaced by error setpoint torques. These error setpoint torques may be allowable torques 124, for example. Corrected setpoint torques 126 generated in this way in first comparison step 122 thus do not exceed allowable torques 124.

A conversion step 128 is then performed on level 2 (reference numeral 114) with the aid of these corrected setpoint torques 126. In this conversion step, corrected setpoint torques 126 are converted into control quantities 130. These control quantities 130 may be, for example, electronic signals which are transmitted to a torque actuator of a motor vehicle drive (not illustrated in FIG. 1). In the event of error-free operation of conversion step 128, control quantities 130 thus represent the "hardware analog" to corrected setpoint torques 126.

The conventional method illustrated in FIG. 1 may be installed in a conventional engine control unit, for example. This engine control unit may have, for example, a microcomputer and other electronic components. The engine control unit does not necessarily need to be integrated in an electronic unit, but may also be installed decentralized in the motor vehicle, for example. The method steps performed on level 1 (reference numeral 110) are advantageously entirely or partly designed as a computer program, the computer program converting, for example, input quantities 116 into setpoint torques 120 in calculation step 118. First comparison step 122 may also be implemented by a computer program. Alternatively or additionally, this first comparison step 122 may, however, also be implemented by an appropriate electronic circuit, for example, an electronic comparator circuit, using which setpoint torques 120 are compared with allowable torques 124 and the minimum of these two values 120, 124 is relayed as corrected setpoint torque 126.

Similarly, conversion step 128 illustrated on level 2 (reference numeral 114) may also be entirely or partly implemented in an engine control unit. In particular, this method step 128 may entirely or partly be implemented in a microcomputer of the engine control unit. This microcomputer may be the same microcomputer also used on level 1 (reference numeral 110) or it may be a separate microcomputer. Furthermore, electronic components may alternatively or additionally also be used. For example, for generating control quantities 130, appropriate electronic converters, filters, output stages, or the like may be used, so that suitable control quantities 130 are generated for torque actuators of the motor vehicle drive. These control quantities 130 may be transmitted to the torque actuator(s) of the motor vehicle via an appropriate conductor system, for example appropriate interface cables (bus system).

As described above, the conventional method illustrated in FIG. 1 has the shortcoming that, while errors on calculation level 110, i.e., errors occurring in calculation step 118 during calculating setpoint torques 120, are detected and compensated. The conversion of these setpoint torques 120 or of the corrected setpoint torques 126 into the corresponding control quantities 130 in conversion step 128 is not checked.

Figure 2:
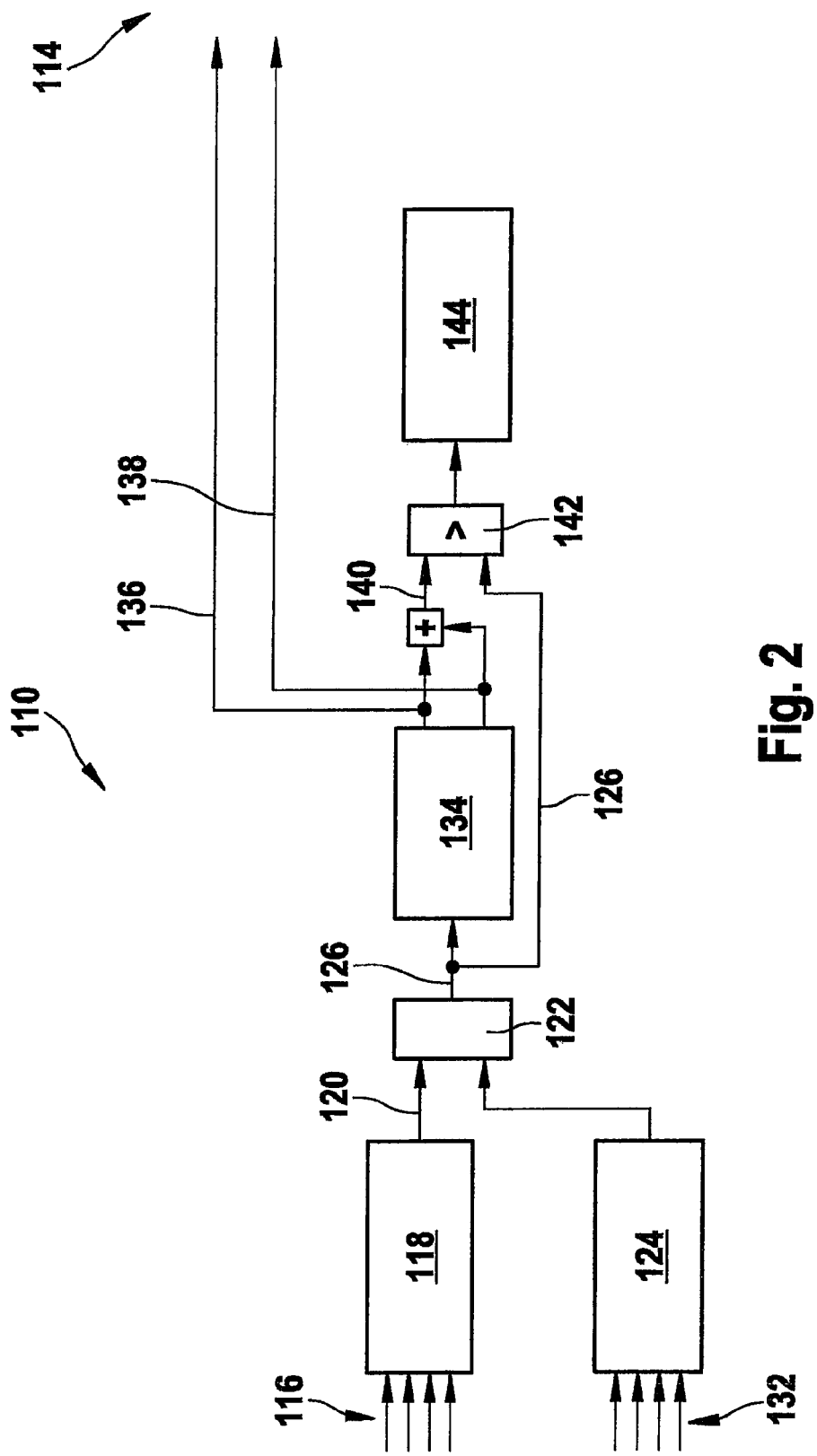
FIG. 2 shows a conventional method for monitoring a torque split for controlling a hybrid drive.

FIG. 2 shows a conventional method, in which the method according to FIG. 1 is extended to the control of a hybrid drive. A setpoint torque 120 is initially calculated on calculation level 110 from input quantities 116, similarly to FIG. 1. Setpoint torque 120 is then again compared in comparison step 122 with an allowable torque 124, which may be calculated for example from the operating conditions (symbolically represented by reference numeral 132 in FIG. 2). In this comparison step 122, a corrected setpoint torque 126, which again may be the smaller of the two quantities 120, 124, is ascertained from setpoint torque 120 and allowable torque 124. In this way it is again ensured that corrected setpoint torque 126 does not exceed allowable torque 124. Corrected setpoint torque 126 is now relayed to a torque splitter 134 to make the operation of a hybrid drive possible. In this torque splitter 134, corrected setpoint torque 126 is split into two individual setpoint torques 136, 138. This split in torque splitter 134 into an individual setpoint torque 136 of an internal combustion engine and an individual setpoint torque 138 of an electric motor may take place in particular in such a way as to ensure optimum energy savings according to input quantities 116 and operating conditions 132. Individual torques 136, 138 are conveyed to conversion level 114 (only indicated in FIG. 2) for conversion into appropriate control quantities.

A comparison of summed torque 140, which is the sum of individual setpoint torques 136, 138 with corrected setpoint torque 126, is provided in the conventional method according to FIG. 2 for monitoring torque splitter 134. This comparison is performed in a comparison step 142. If it is established that summed torque 140 is greater than corrected total setpoint torque 126, an error is detected in torque splitter 134 and the system is switched over to an alternative operation 144. In this alternative operation 144, individual setpoint torques 136, 138 may be replaced by appropriate replacement quantities, for example. Basically, in alternative operation 144, the electric motor is initially set into generator operation and, if the difference persists, the internal combustion engine is finally switched to the above-described EMB operation. However, in this conventional method, it is not possible to differentiate between differences caused by the electric motor and differences caused by the internal combustion engine.

Figure 3:
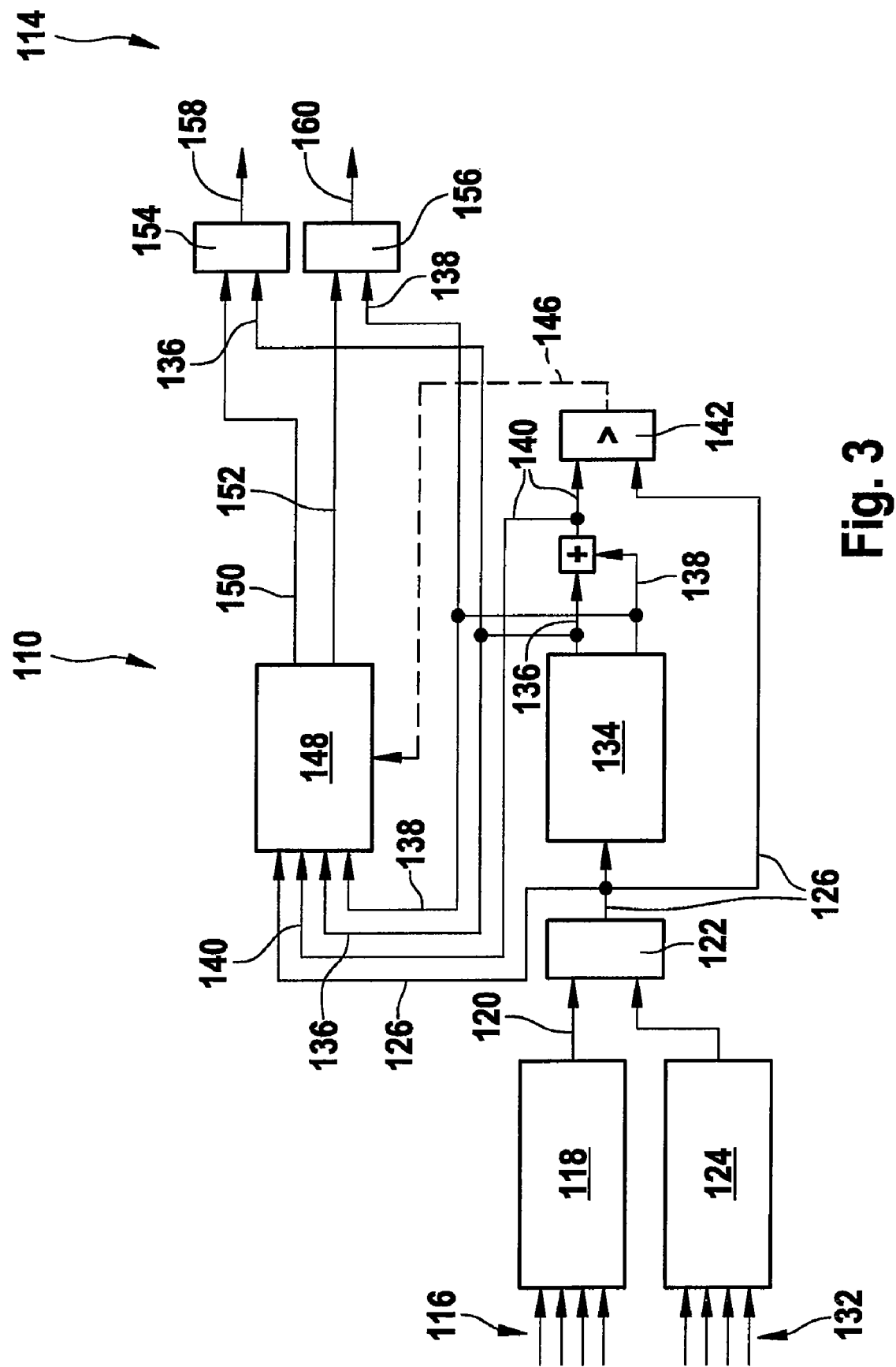
FIG. 3 shows a preferred exemplary embodiment of a method according to the present invention for controlling a hybrid drive.

In contrast, FIG. 3 shows an example method according to the present invention which does not have these disadvantages of the method according to FIG. 2 and, accordingly, is better suited for the specific characteristics of a hybrid drive.

Again, in the preferred embodiment of the example method according to the present invention according to FIG. 3, setpoint torques 120 are first calculated from input quantities 116 in a calculation step 118, followed by a comparison (step 122) with allowable torques 124, which are again determined from operating conditions 132. In comparison step 122, a corrected total setpoint torque 126 is generated, which is again the smaller of values 120, 124, for example. Similarly to FIG. 2, this corrected total setpoint torque 126 is converted into two individual setpoint torques 136, 138 in a step of torque splitter 134. Again, a summed torque 140 is formed from these individual setpoint torques 136, 138 which is compared in step 142 with corrected total setpoint torque 126 for checking.

However, unlike in the method according to FIG. 2, no unconditional switchover to an alternative operation 144 occurs when a difference between torques 140, 126 is established in comparison step 142. Instead (dashed line 146 in FIG. 3), a limitation step 148 is initiated when a difference is established in comparison step 142.

This limitation step 148 uses individual setpoint torques 136, 138 as well as corrected total setpoint torque 126 and summed torque 140 as input quantities. Instead of the above-described conventional alternative operation 144, in which normally at least one of the two individual setpoint torques 136, 138 is set to 0, individual setpoint torques 136, 138 are limited in limitation step 148 by downscaling with the help of a limiting factor. Limited individual setpoint torques 150, 152 are thus generated from individual setpoint torques 136, 138. In this exemplary embodiment, a limiting factor that is identical for the internal combustion engine and the electric motor is used, which is calculated from the ratio of the corrected total setpoint torque to summed torque 140. Accordingly, limited individual setpoint torque 150 of the internal combustion engine results as:

$$M_{eng,limit} = M_{eng,setpoint} \times M_{setpoint}/M_{Sum},$$

where $M_{eng,limit}$ is limited individual setpoint torque 150 of the internal combustion engine, $M_{eng,setpoint}$ is individual setpoint torque 136 of the internal combustion engine, $M_{setpoint}$ is corrected total setpoint torque 126, and $M_{sum}$ is summed torque 140.

Limited individual setpoint torque 152 of the electric motor is calculated similarly:

$$M_{elm,limit} = M_{elm,setpoint} \times M_{setpoint}/M_{sum}$$

where $M_{elm,limit}$ is limited individual setpoint torque 152 of the electric motor and $M_{elm,setpoint}$ is individual setpoint torque 138 of the electric motor.

This preferred way of carrying out limitation step 148 ensures that individual setpoint torques 136, 138 are scaled down according to the excess by summed torque 140 over corrected total setpoint torque 126. This allows in particular minor differences to be initially compensated without recourse to an alternative operation involving major changes in the operating state, in particular shut-off of individual motors of the hybrid drive.

These limited individual setpoint torques 150, 152 may now be transmitted directly from calculation level 110 to conversion level 114. The particularly preferred embodiment in the method according to FIG. 3 also takes into account, however, that in limitation step 148 errors may occur, so that limited individual setpoint torques 150, 152 may be too high due to these errors. To further reduce this risk, two additional comparison steps 154, 156 follow limitation step 148 in FIG. 3. In these additional comparison steps 154, 156, limited individual setpoint torques 150, 152 are again compared with individual setpoint torques 136, 138, which were generated by torque splitter 134. The comparison may be performed similarly to comparison step 122. In particular, the smaller value of the two input quantities may be generated as an output quantity in these comparisons 154, 156. Again, tolerance values or tolerance thresholds may be used, so that a slight difference may be tolerated. These tolerance values may again be also set to 0.

In this way, comparison 154 of individual setpoint torques 150, 136 of the internal combustion engine generates a corrected individual setpoint torque 158 of the internal combustion engine. Similarly, comparison 156 of individual setpoint torques 152, 138 of the electric motor generates a corrected individual setpoint torque 160 of the electric motor. These corrected individual setpoint torques 158, 160 are now conveyed to conversion level 114 for conversion into appropriate control quantities.

In addition to the above-described check mechanisms, which are to prevent the motors from being driven at excessively high setpoint torques, other check mechanisms may also be provided. Thus, for example, actual torques of the motors may be measured and fed back to the engine control unit. For example, actual torques may be measured for the internal combustion engine and for the electric motor, for example, via appropriate torque sensors on the respective shafts. These actual torques may then be compared with the respective corrected individual setpoint torques 158, 160 (if necessary, with the help of time-delay elements and filters, for example, to compensate conversion delays) and, in the event of differences, error measures may be initiated. In this way, the present invention may be advantageously refined and the likelihood of errors further reduced.

What is claimed is:

1. A method for controlling a motor vehicle drive, the motor vehicle drive having at least two individual motors, the method comprising:
   calculating at least one total setpoint torque in a first step;
   splitting the at least one total setpoint torque into at least two individual setpoint torques of the at least two individual motors in a second step;
   comparing a sum of the at least two individual setpoint torques with the total setpoint torque in a first individual torque comparison step;
   in the event of a difference by more than a predefined tolerance value in the individual torque comparison step, initiating a limitation step, the at least two individual setpoint torques each being multiplied by a limiting factor in the limitation step to generate at least two limited individual setpoint torques.

2. The method as recited in claim 1, wherein the total setpoint torque is ascertained in a torque request step in which a calculated setpoint torque is compared to an allowable torque and the total setpoint torque is set equal to a smaller torque of a group comprising the calculated setpoint torque and the allowable torque.

3. The method as recited in claim 1, wherein the at least two individual setpoint torques are compared with at least two individual setpoint torques in at least one second individual setpoint torque comparison step, and in an event of a difference between the individual setpoint torques and a corresponding limited individual setpoint torques by more than a predefined tolerance value, corresponding corrected individual setpoint torques are generated.

4. The method as recited in claim 3, wherein the corrected individual setpoint torques are a smaller value of a group comprising an individual setpoint torque and a corresponding limited individual setpoint torque.

5. The method as recited in claim 1, wherein in the limitation step the limiting factors are the same for all individual setpoint torques.

6. The method as recited in claim 5, wherein the limiting factor is a ratio between the total setpoint torque and a sum of the at least two individual setpoint torques.

7. The method as recited in claim 3, wherein, in a subsequent implementation step, the individual setpoint torques or the limited individual setpoint torques or the corrected individual setpoint torques are converted into at least two control quantities for controlling the at least two motors.

8. The method as recited in claim 7, wherein at least two actual torques of the at least two motors are ascertained, a comparison being performed between the at least two actual torques and the at least two individual setpoint torques or the limited individual setpoint torques or the corrected individual setpoint torques, and in the event of a difference between actual torques and the corresponding individual setpoint torques or the limited individual setpoint torques or the corrected individual setpoint torques exceeding a predefined threshold, the corresponding at least one control quantity is replaced by at least one alternative control quantity.

9. The method as recited in claim 1, wherein the actual torques are ascertained by at least one of the following methods: measurement of an internal cylinder pressure; oscillation of a rotational speed signal of a crankshaft; conversion of the at least one control quantity; conversion of current, voltage, and rotational speed of an electric motor;
feedback via a bus system; via at least one torque sensor on a crankshaft or camshaft.

10. The method as recited in claim 8, wherein the at least two actual torques, the at least two individual setpoint torques, the limited individual setpoint torques, or the corrected individual setpoint torques are at least one of filtered and delayed with the aid of a time-delay element prior to performing the comparison.

11. An engine control unit for a motor vehicle drive, comprising:
at least two individual motors;
a calculating arrangement to calculate at least one total setpoint torque ;
a splitting arrangement to split the at least one total setpoint torque into at least two individual setpoint torques of the at least two individual motors; and
a comparing arrangement to compare a sum of the at least two individual setpoint torques with the total setpoint torque in a first individual torque comparison step;
wherein in the event of a difference by more than a predefined tolerance value in the individual torque comparison, initiating a limitation operation, the at least two individual setpoint torques each being multiplied by a limiting factor in the limitation operation to generate at least two limited individual setpoint torques.

* * * * *